(12) United States Patent
Nishida et al.

(10) Patent No.: US 6,349,086 B2
(45) Date of Patent: Feb. 19, 2002

(54) OPTICAL DISC AND METHOD FOR MANUFACTURING SAME

(75) Inventors: Masato Nishida, Tokyo; Tetsuhiro Sakamoto, Chiba; Toshiyuki Kashiwagi; Motohiro Furuki, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/226,701

(22) Filed: Jan. 7, 1999

(30) Foreign Application Priority Data

Jan. 9, 1998 (JP) .......................... 10-003485

(51) Int. Cl.$^7$ .............. G11B 3/70; G11B 5/84
(52) U.S. Cl. ...................................... 369/280
(58) Field of Search ...................... 369/280, 272, 369/275.1–275.5, 283, 286

(56) References Cited

U.S. PATENT DOCUMENTS

| | | | |
|---|---|---|---|
| 5,202,863 A | * 4/1993 | Miyatake et al. | ............. 369/13 |
| 5,714,222 A | * 2/1998 | Yokoyama | ................ 428/64.1 |
| 5,930,088 A | * 7/1999 | Yoshida et al. | ............. 360/114 |

FOREIGN PATENT DOCUMENTS

| | | | |
|---|---|---|---|
| JP | 63-010348 | * | 1/1988 |
| JP | 2-167789 | * | 6/1990 |
| JP | 2-223480 | * | 9/1990 |
| JP | 4-289537 | * | 10/1992 |
| JP | 5-47050 | * | 2/1993 |
| JP | 5-325287 | * | 12/1993 |
| JP | 6-150402 | * | 5/1994 |
| JP | 8-077629 | * | 3/1996 |

\* cited by examiner

*Primary Examiner*—William Klimowicz
(74) *Attorney, Agent, or Firm*—Bell, Boyd & Lloyd LLC (57) ABSTRACT

An optical disc and its manufacturing method in which humps may be prohibited from being formed on an outer rim area of the disc to assure optimum surface properties of a light transmitting layer of the disc to contribute to further increase in recording capacity. On a substrate 2 of an optical disc 1 are sequentially formed a recording portion 6 and a light transmitting layer 5. The light falls on the light transmitting layer 5 to record and/or reproduce information signals for a signal recording area 6a of the substrate 2. The radial distance D from the outermost rim of the substrate 2 to the signal recording area 6a is selected to be larger than the radial width L of a hump 5a formed on the outer rim of the light transmitting layer 5. The hump 5a has a height h from the surface of the light transmitting layer 5 not larger than 70 μm.

8 Claims, 9 Drawing Sheets

OPTICAL DISC AND METHOD FOR MANUFACTURING SAME

BACKGROUND OF THE INVENTION

1. Field of the Invention

This invention relates to an optical disc having a substrate and a recording layer and a light transmitting layer formed in this order thereon and which is adapted for recording and/or reproducing information signals on the recording layer by the light incident on the light transmitting layer.

2. Description of the Related Art

Among optical recording mediums for audio or video, adapted for recording the various information thereon, there are, for example, an optical disc on which information signals are pre-recorded by embossed pits, a phase-change disc on which information signals are written by exploiting phase changes of the recording film, and a magneto-optical disc on which information signals are written by exploiting the photomagnetic effect of the recording film. With this type of the optical recording medium, a recording layers, a light reflecting layer and a protective layer are sequentially formed on a transparent substrate, and the laser light is adapted to fall from the transparent substrate side for recording and/or reproducing information signals on the recording layer.

Meanwhile, with the conventional optical disc, the recording density of the optical disc is determined by the minimum spot diameter of a laser light source employed. That is, the smaller the laser spot diameter, the higher is the recording density that can be achieved. This laser spot diameter is proportionate to the $\lambda/NA$ of the of the recording/reproducing optical system, where $\lambda$ is the wavelength of the laser light and NA is the numerical aperture of an objective lens. Thus, if desired to realize high recording density of the optical disc, the wavelength $\lambda$ of the laser light needs to be reduced to increase the numerical aperture of the objective lens.

However, if the numerical aperture of the objective lens is increased, coma aberration poses a problem, since coma aberration is proportionate to [skew angle, that is the tilt angle of the objective lens to the optical axis of the optical disc]×NA3×[thickness of the optical disc traversed by the laser light]. For tackling with this problem of coma aberration, a method of reducing the thickness of the transparent substrate, as a disc substrate, is under consideration.

However, for the transparent substrate of the optical disc, an injection-molded substrate of plastics, produced by the injection molding method, is predominantly used. It is technically difficult to fabricate the injection-molded substrate to an extremely thin thickness and to high precision. The method for improving the recording density of the conventional optical disc by reducing the wavelength $\lambda$ of the laser light or by enlarging the numerical aperture of the objective lens is, as it were, approaching a technically unsurmountable limit level.

The present inventors have proposed an optical disc in which, for possibly improving the recording density further, a light reflecting layer, a recording layer and a light transmitting layer are sequentially formed on a substrate and the laser light is caused to fall from the light transmitting layer to record and/or reproduce information signals on a signal recording area of the signal recording layer.

In particular, since the optical disc is fabricated by sequentially forming the light reflecting layer, recording layer and the light transmitting layer on the substrate, the light transmitting layer on which falls the laser light can be manufactured to a thin thickness and to high accuracy. The result is that the optical disc can sufficiently cope with the high NA of the objective lens to improve the recording density.

The methods for forming the light transmitting layer on the optical disc may be exemplified by a first method of sequentially forming a light reflecting layer and a recording layer on a substrate and subsequently affixing a resin sheet 100 μm in thickness on the recording layer via a transparent adhesive layer several μm in-between to form a light transmitting layer formed by the resin sheet, and a second method of dripping a UV curable resin on the recording layer and stretching the UV curable resin on rotation and illuminating the UV rays on the substrate kept in a stationary state to cure the resin to form the light transmitting layer.

With the first method, the light transmitting layer exhibits optimum thickness evenness. However, this light transmitting layer is difficult to manufacture with respect to handling of the resin sheet and double refraction and hence it has scarcely put to practical use.

With the second method, a center opening in the substrate is temporarily stopped and, in this state, a UV curable resin is dripped onto this center hole and stretched on rotation. The substrate is then kept in a stationary state and irradiated with the UV rays to cure the UV curable resin to form the light transmitting layer. Since this second method represents further development of the technique of forming a protective film for a conventional optical disc, such as compact disc (CD), and hence the stock handling, know-how in coating and designing of the apparatus so far developed can be utilized, it lends itself to mass production.

Figure 17:
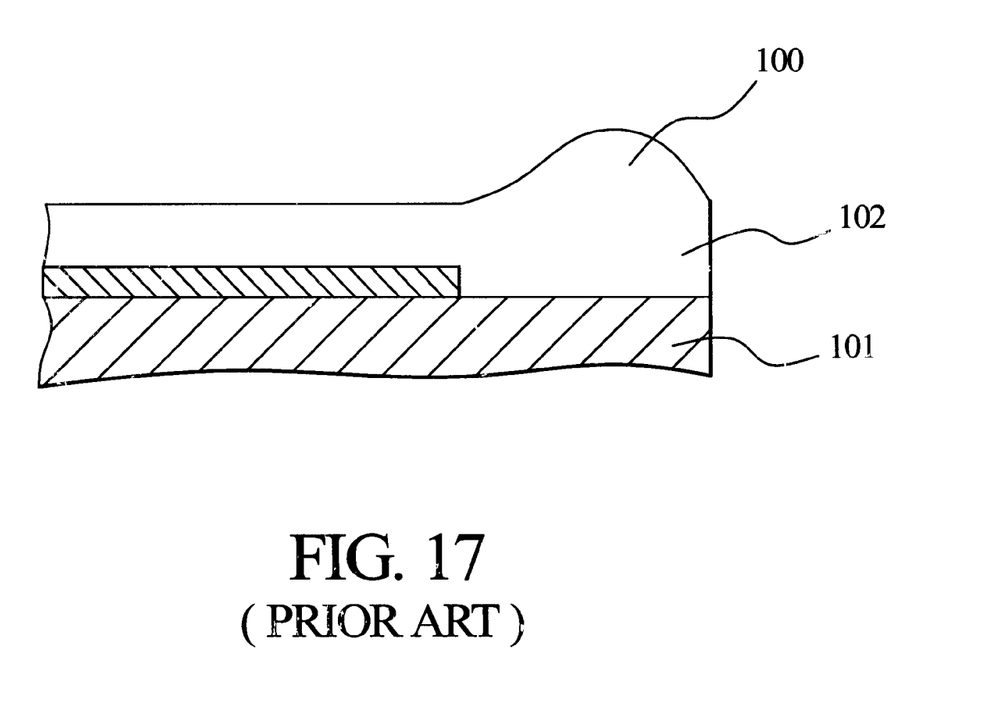
FIG. 17 is an enlarged cross-sectional view showing an outer rim portion of a conventional optical disc.

However, with this second method, in which the UV curable resin is stretched on rotation, the resin tends to be moved towards the outer rim during the stretching process under the centrifugal force, so that a protuberant portion tends to be produced in an outer rim portion. Moreover, with this second method, since the UV rays are illuminated on the substrate 101 coated with the UV curable resin by rotational stretching, as the substrate is kept stationary, the resin deposited on the outer rim portion is raised and reverted towards the inner rim side under the surface tension to form a humped portion 100 of a sizeable width, as a result of which the light transmitting layer 102 presents a hump 100 on its outer rim portion.

If the UV curable resin s coated to a film thickness of 100 μm on the substrate of the same size as the conventional CD, with the substrate being then rotated for stretching the resin and then being halted to illuminate the UV rays to form the light transmitting layer thereon, there is formed a humped portion in the outer rim area having a radial width of 5 mm or more, thus narrowing the signal recording area.

If the humped portion having a width sufficient to affect the signal recording area is formed in this manner on the outer rim area of the light transmitting layer, a sufficient signal recording area cannot be obtained to render it impossible to improve the recording capacity or to lead possibly to reduced recording capacity. Specifically, for realizing the high recording capacity, it is necessary to procure a signal recording area comparable to that of the CD or DVD. In order to achieve this, the humped portion formed on the outer rim of the light transmitting layer needs to be of a width of not larger than 1.5 mm.

SUMMARY OF THE INVENTION

It is therefore an object of the present invention to provide an optical disc that can be increased further in recording capacity and that has a light transmitting layer of optimum surface properties free to the utmost extent from humps on its outer rim portion, and method for manufacturing such optical disc.

In one aspect, the present invention provides an optical disc in which a recording layer and a light transmitting layer are sequentially formed on a substrate and in which light is incident from the side of the light transmitting layer to record and/or reproduce information signals for a signal recording area of the recording layer, wherein a radial distance from the outermost area of the substrate to signal recording area is selected to be larger than a radial width of a hump produced on the outer rim of the light transmitting layer and wherein the height of hump from the surface of the light transmitting layer is 70 μm or less.

The optical disc of the present invention, in which the width and the height of a hump formed at an outer rim of the light transmitting layer following the manufacture of the disc are limited as described above, has optimum surface properties by having the light transmitting layer free from surface irregularities as far as possible to provide a signal recording area as broad as possible.

In another aspect, the present invention provides a method for producing an optical disc in which a recording layer and a light transmitting layer are sequentially formed on a substrate and in which light is incident from the side of the light transmitting layer to record and/or reproduce information signals, including the steps of coating, at the time of forming the light transmitting layer, a UV curable resin on the portion of the substrate carrying recording layer and rotating the substrate carrying the UV curable resin coated thereon and concurrently illuminating UV rays on UV curable resin to cure UV curable resin.

With the optical disc manufacturing method according to the present invention, UV rays are illuminated on the substrate, carrying the UV curable resin, as the disc is run in rotation, thus minimizing the risk of the UV curable resin on the outer rim of the substrate reverting to the inner rim under centrifugal force to produce a hump.

DESCRIPTION OF THE PREFERRED EMBODIMENTS

Figure 1:
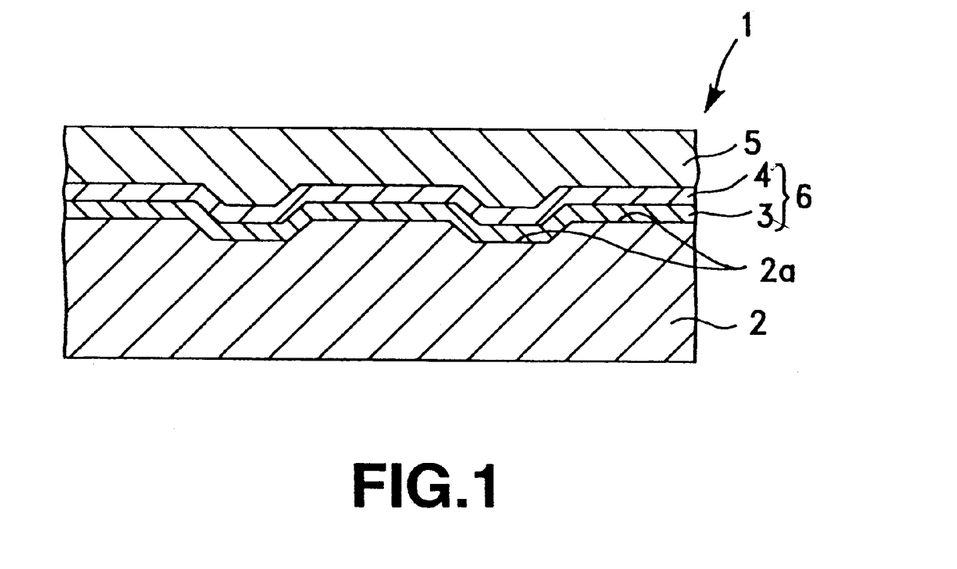
FIG. 1 is a cross-sectional view of a typical optical disc embodying the present invention.

Referring to the drawings, preferred embodiments of the present invention will be explained in detail. FIG. 1 shows a typical optical disc embodying the present invention.

An optical disc 1, embodying the present invention, has a light reflecting layer 3, a recording layer 4 and a light transmitting layer 5, layered in this order on a substrate 2. The light reflecting layer 3 and the recording layer 4 make up a signal recording layer 6. With the present optical disc 1, light is caused to fall on the light transmitting layer 5 to record and/or reproduce information signals for the signal recording layer 6.

On a major surface 2a of the substrate 2 are formed fine crests and valleys, such as recording grooves or pre-grooves, for recording signals, such as information signals. The substrate 2 preferably has a thickness of 0.3 to 1.2 mm. The materials of the substrate 2 may be enumerated by plastics, including acrylic resins, such as polycarbonate or polymethyl methacrylate (PMMA), and glass. The substrate is molded by injection molding and by a photopolymer (2P) method in the former and latter cases, respectively.

The light reflecting layer 3, formed on the crests and valleys on the major surface 2a of the substrate 2, operates not only as a reflecting layer for reflecting the light transmitted through the recording layer 4, but also as a heat sink layer for preventing heat from being generated excessively in the recording layer 4.

The light reflecting layer 3 is preferably formed of elements metal, metalloids, semiconductor elements, which may be used singly or in combination.

Most preferred is a material mainly composed of Al and containing 0.4 to 0.8 wt % of Si, not more than 0.7 wt % of Fe, 0.15 to 0.40 wt % of Cu, not more than 0.15 wt % of Fe, 0.8 to 1.2 wt % of Mg, 0.04 to 0.35 wt % of Cr, not more than 0.25 wt % of Zn and not more than 0.15 wt % of Ti. The light reflecting layer 3 is formed as a thin film having a thickness of 50 to 200 nm.

The above material is preferred in that, if a phase-change recording layer formed of a phase change material is layered as a recording layer 4 on the light reflecting layer 3, the phase-change recording layer is affected to a lesser extent by the crystallinity of the light reflecting layer 3 or by the interface formed by the crystal grains of the light reflecting layer 3, as a result of which the phase change recording layer correctly reflects the surface state of the substrate 2.

The methods for forming the light reflecting layer 3 of the above-mentioned material on the substrate 2 may be enumerated by an ion beam sputtering method, a dc sputtering method and an RF sputtering method. Of these, the ion beam sputtering method is most preferred.

The recording layer 4 is an optical recording layer for which information signals can be written or erased by illumination of the laser light. This recording layer may be formed of a phase-change material undergoing reversible phase change between crystal and amorphous phases or of a photomagnetic recording material which loses coercivity on temperature increase beyond the Curie temperature to undergo inversion of magnetization to the direction of the external magnetic field.

As a photomagnetic recording layer, there is used a perpendicular magnetic recording film exhibiting photomagnetic characteristics, including Kerr effect or the Faraday effect, such as an amorphous alloy thin film, exemplified by Tb—Fe—Co thin film.

In the case of a read-only optical disc, a pre-set pattern of lands and recesses corresponding to a signal pattern is formed on the substrate 2. The recording area is completed by coating the pattern of lands and recesses with the light reflecting layer 3.

The laser light falls on the light transmitting layer 5 at the time of recording/reproduction of information signals. This light transmitting layer 5 also operates as a protective layer to prohibit the recording layer 4 from coming into contact with corrosive factors, such as moisture.

The light transmitting layer 5 is formed by forming a UV curable resin on a signal recording portion 6 by a manufacturing method of the present invention as will be explained subsequently.

This light transmitting layer 5 is preferably of a thickness of 3 to 177 $\mu$m in consideration that the lower limit of the thickness of the light transmitting layer 5 is determined in dependence upon whether or not the protective function of the light transmitting layer performing the role of protecting the recording layer 4 or the light reflecting layer 3 can thereby be assured. That is, the thickness of the light transmitting layer 5 not less than 3 $\mu$m is required in consideration of the reliability of the optical disc and the effect of collision of the objective lens on the surface of the light transmitting layer 5. On the other hand, the maximum thickness of the light transmitting layer 5 of 177 $\mu$m is desirable in consideration that the shorter wavelength of the laser light is realized in future such that the blue laser light thought to be promising in near future is to be coped with rather than the currently used red laser light.

Therefore, the thickness t of the light transmitting layer 5 ranging between 3 $\mu$m and 177 $\mu$m is preferred.

The shape of the outer rim of the optical disc 1 of the present invention, constructed as described above, is hereinafter explained.

Figure 2:
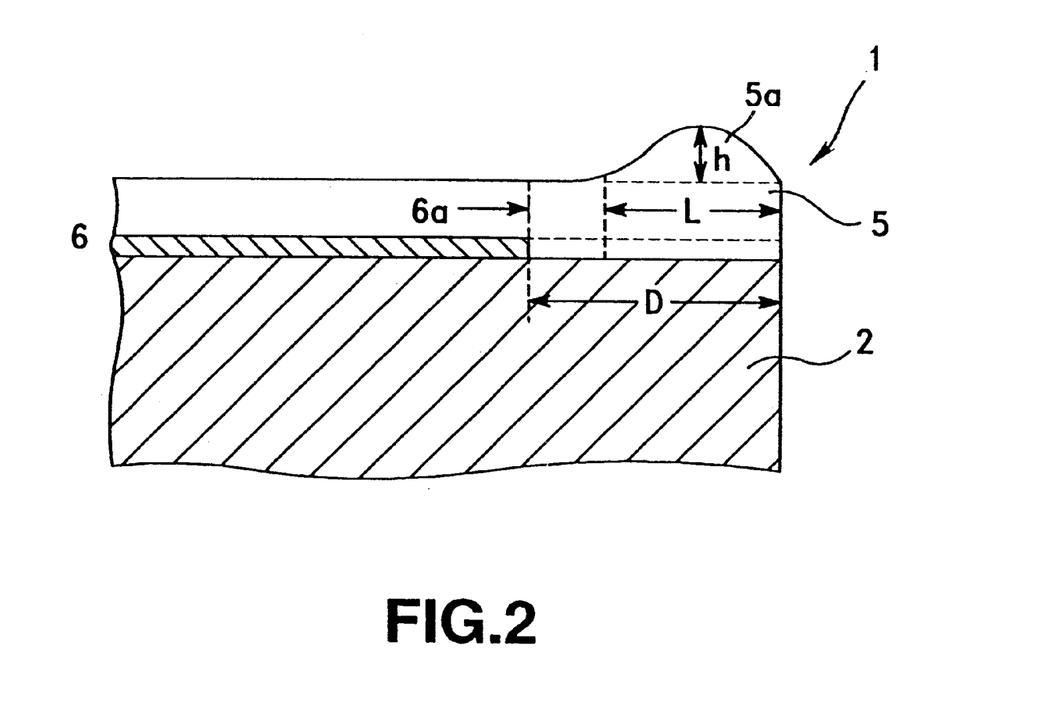
FIG. 2 is an enlarged cross-sectional view of an outer rim of an optical disc embodying the present invention.

FIG. 2 shows, in a cross-sectional view, the outermost rim of the optical disc 1 of the present invention to an enlarged scale, without, however, showing the lands and recesses of the signal recording portion 6. In this signal recording portion 6, an area which actually is used for recording/reproducing the information signals is indicated as a signal recording area 6a.

In particular, in the optical disc 1 according to the present invention, a hump 5a formed on the outer rim of the light transmitting layer 5 following the end of the manufacturing process has a height h from the surface of the light transmitting layer 6 equal to 70 $\mu$m or less.

For achieving high recording density of an optical disc, the light transmitting layer 5 illuminated by the light is reduced in thickness, as in the optical disc embodying the present invention, or the numerical aperture NA of the objective lens of the optical pickup is increased. That is, if, in the optical disc in which the light is caused to fall from the side of the light transmitting layer 5 for recording/reproducing the information signals, a higher recording density is to be achieved, an optical pickup having its objective lens of a higher NA value is to be used, as a result of which the working distance between the optical pickup and the optical disc is reduced.

Specifically, the working distance between the optical pickup and the optical disc is approximately 100 $\mu$m, depending on the designing of the optical pickup. This working distance is smaller by one digit of magnitude than that in a compact disc CD or a digital versatile disc DVD. Thus, the optical disc is more susceptible to collision against the optical pickup than the conventional CD or DVD. For reducing the damage possibly inflicted to the optical pickup by such collision, there is provided a protector at a distal end of the usual optical pickup opposite to the optical disc. This protector is mounted at a distance of approximately 30 $\mu$m from the optical pickup.

Therefore, the height of a hump, inevitably formed on the readout surface of the optical disc for the reason pertinent to the optical disc manufacture, needs to be suppressed to be 70 $\mu$m or less.

That is, with the optical disc embodying the present invention, in which the height h of the hump 5a formed on the outer rim of the light transmitting layer 5 is set so as to be not larger than 70 $\mu$m, it is possible to avoid the phenomenon of the optical pickup and the optical disc colliding against each other even if the objective lens has an enlarged numerical aperture NA to meet the requirement for high recording density and thus the distance between the optical disc and the optical pickup, that is the working distance, is reduced. Therefore, the optical disc 1 embodying the present invention is able to sufficiently meet the demand for the higher recording density.

As for the height h of the hump 5a of the light transmitting layer 5, it is preferably not larger than approximately 20 $\mu$m, in consideration that contaminants such as dust and dirt tend to be affixed to the surface of the optical disc. It is because the dust and dirt tending to affect the recording/reproducing characteristics are usually of a size of 30 to 40 $\mu$m.

Also, with the optical disc according to the present invention, the radial distance from the outermost rim of the substrate 2 to the signal recording area 6a is larger than the width in the radial direction of the hump 5a formed on the outermost rim of the light transmitting layer. Thus, with the optical disc 1, the signal recording area 6a can be enlarged effectively to increase the recording capacity further.

It is now assumed that the distance from the outermost rim of the substrate 2 to the signal recording area 6a is D mm and that the width of the hump 5a formed on the outermost rim of the optical disc is L mm.

Meanwhile, in the conventional compact disc, the diameter of the optical disc and that of the signal recording area are approximately 60 mm and approximately 58.5 mm, respectively. That is, with the conventional CD, the distance D from the outermost rim of the disc to the signal recording area 6a is approximately 1.5 mm.

Thus, for assuring a recording capacity of the inventive optical disc equivalent to that of the conventional CD, the width L of the hump 5a produced at the outermost rim of the light transmitting layer 5 needs to be 1.5 mm or less.

In particular, since it is necessary with the optical disc according to the present invention to set the signal recording area 6a so as to be broader to achieve the recording capacity larger than that of the conventional CD, the distance D from the outermost rim of the disc to 6a needs to be approximately 1.0 mm.

Thus, with the optical disc, a larger recording capacity can be achieved if the width L of the hump 5a at the outermost rim of the light transmitting layer 5 is 1.0 mm or less.

Also, with the present optical disc 1, the relation of D−0.5≧L mm is preferably met. That is, the difference between the distance D from the outermost rim of the disc to the signal recording area 6a and the width L of the hump 5a at the outermost rim of the light transmitting layer 5 is preferably not less than 0.5 mm. The reason is that, in this case, the hump 5a affects the recording or reproducing characteristics to the least extent to assure optimum recording/reproducing characteristics of the optical disc 1.

That is, with the present optical disc 1, the signal recording area can be increased to assure a larger recording capacity. Also, with the present optical disc 1, in which the light transmitting layer 5 is formed which has optimum surface properties and which is thin in film thickness, the light falls from the side of the light transmitting layer 5 for recording/reproducing information signals for the signal recording portion 6, the high NA of the objective lens and high recording density can be sufficiently coped with. Moreover, the optical disc 1 has stable recording/reproducing characteristics and hence high operational reliability.

The method for fabricating the optical disc 1 constructed as described above is hereinafter explained in detail.

For manufacturing the optical disc 1, substrate 2, having a pre-set pattern of lands and recesses formed thereon in meeting with the guide groove or the information signals, is fabricated by an injection molding method.

Then, a light reflecting layer 3 is formed to a film thickness of 150 nm on the substrate 2, by an ion beam sputtering method, using a material mainly composed of Al and containing 0.4 to 0.8 wt % of Si, not more than 0.7 wt % of Fe, 0.15 to 0.40 wt % of Cu, not more than 0.15 wt % of Mn, 0.8 to 1.2 wt % of Mg, 0.04 to 0.35 wt % of Cr, not more than 0.25 wt % of Zn and not more than 0.15 wt % of Ti. This film-forming method by ion beam sputtering gives an optical disc having signal properties better than those of the method by dc sputtering.

On the light reflecting layer 3, thus formed, a first protective film of a dielectric material composed of a mixture of ZnS and $SiO_2$, a film of a phase-change material, composed of GeSbTe, and a second protective film of a dielectric material, composed of ZnS and $SiO2$, are sequentially layered to complete the recording layer 4.

The film thicknesses of the first protective film, film of the phase-change material and the second protective film are 20 nm, 25 nm and 100 nm, respectively.

Finally, a UV curable resin is formed on the recording layer 4 by the spin coating method, now to be explained, to form the light transmitting layer 5 with a film thickness of 0.1 mm, to fabricate the optical disc 1.

Figure 3:
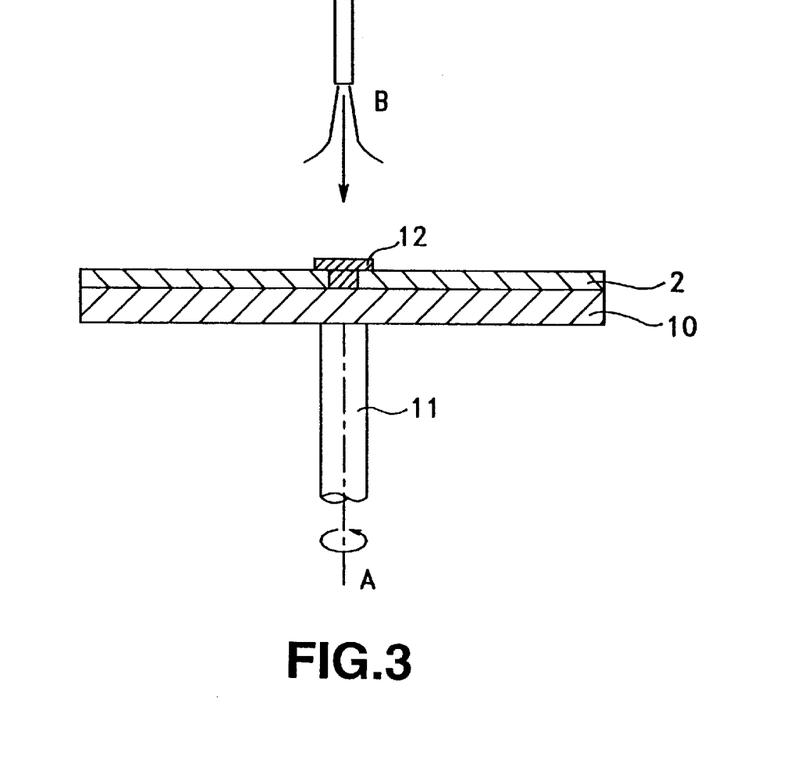
FIG. 3 is a cross-sectional view showing a step of coating of a UV curable resin in the manufacturing method of an optical disc embodying the present invention.

For forming the light transmitting layer 5 by the optical disc manufacturing method according to the present invention, a spin coating device, shown for example in FIG. 3, is used. Although the light transmitting layer 5 is formed on the substrate 2 carrying the recording layer 4, this recording layer 4 is not shown in FIG. 3.

With the optical disc manufacturing method according to the present invention, the substrate 2, carrying the recording layer 4, is arranged on a turntable 10 rotatably supported on a center rotation supporting member 11. The substrate 2 is arranged on the turntable 10 so that the recording layer 4 as a film-forming surface is opposite to the substrate surface contacted with the turntable 10. With the center opening portion of the substrate 2 being stopped by a lid member 12, the substrate 2 is run in rotation a an rpm of 800 in the direction indicated by arrow A in the drawing and, under this condition, the UV curable resin is dripped in the direction indicated by arrow B in the drawing onto the lid member 12 disposed at the center of the substrate 2. The substrate 2 is then set into rotation for stretching the UV curable resin over the recording layer 4 of the substrate 2.

Figure 4:
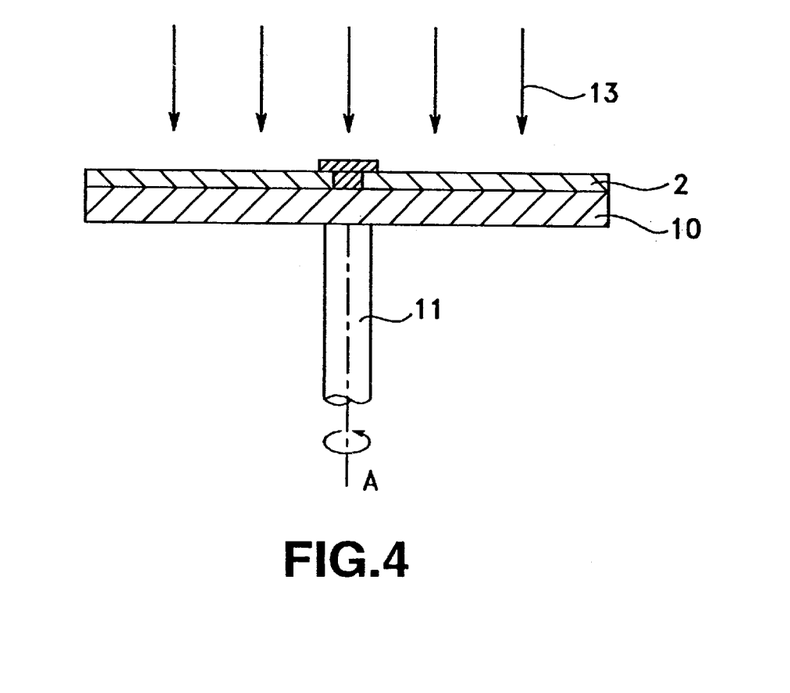
FIG. 4 is a cross-sectional view showing a step of illuminating UV rays on a UV curable resin in the manufacturing method of an optical disc embodying the present invention.

Then, in the optical disc manufacturing method of the present invention, the rpm by the rotation supporting member 11 is reduced to, for example, 400. As the substrate is rotated in this condition further, UV rays are illuminated on the resin coated on the recording layer 4 of the substrate 2. Finally, the UV curable resin is cured to form the light transmitting layer 5.

The rpm for illumination of UV rays is preferably of the order of 40 to 50% or 40 to 60% of the rpm for stretching of the UV curable resin by rotation if the latter is approximately 1000 or less or not less than 1000, respectively.

In the conventional spin coating method, the UV rays are illuminated while the substrate 2 is stationary. However, with the optical disc manufacturing method according to the present invention, the UV rays are illuminated while the substrate 2 is kept in rotation.

With the optical disc manufacturing method according to the present invention, as described above, the light transmitting layer is manufactured by the spin coating method by dripping the UV curable resin on the recording layer 4 of the rotating substrate 2 for stretching the resin and by illuminating the UV rays on the UV curable resin, with the substrate 2 being kept in rotation at a reduced rpm.

That is, the optical disc manufacturing method according to the present invention is a method of illuminating the UV rays on the rotating substrate to cure the resin. Specifically, the UV curable resin is stretched on rotation on the recording layer 4 on the substrate rotating at an rpm of 800 and subsequently the UV rays continue to be illuminated on the substrate 3 at a reduced 400 rpm.

An experimental example is now shown in which the optical disc is manufactured using an optical disc embodying the present invention.

First, a substrate 120 mm in diameter was prepared by injection molding. On this substrate was dripped a UV curable resin 2200 cps in viscosity and stretched on rotation at 810 rpm to apply the UV curable resin to a thickness of 100 $\mu$m.

As the substrate was kept rotating at 400 rpm, UV rays were irradiated thereon for 25 seconds to cure the resin to form the light transmitting layer to produce the ultimate optical disc.

The optical disc, thus prepared, had the hump with a width L of approximately 3 mm on the outer rim of the light transmitting layer.

The UV curable resin with a viscosity of 4500 cps was dripped on a similar substrate and coated thereon to a thickness of 100 μm on stretching by rotation at 1200 rpm. The substrate, run in rotation at 500 rpm, was irradiated with UV rays for 25 sec to cure the resin to form the light transmitting layer to produce the ultimate optical disc.

The optical disc, thus prepared, had the hump with a width L of approximately 2 mm on the outer rim of the light transmitting layer.

Thus, with the optical disc manufacturing method according to the present invention, in which the UV curable resin is cured as the substrate is kept in a rotating state, it is possible to suppress the phenomenon of the UV curable resin from reverting from the outer rim side to the inner rim side to produce a hump by surface tension as far as possible.

Thus, with the present optical disc manufacturing method, such optical disc 1 can be manufactured which has the light transmitting layer 5 of optimum surface properties and an effectively broad signal recording area 6a and which can realize a further increased recording capacity.

Meanwhile, a glass plate may be set on the UV curable resin dripped prior to illuminating the UV rays prior to illumination of UV rays.

Figure 5:
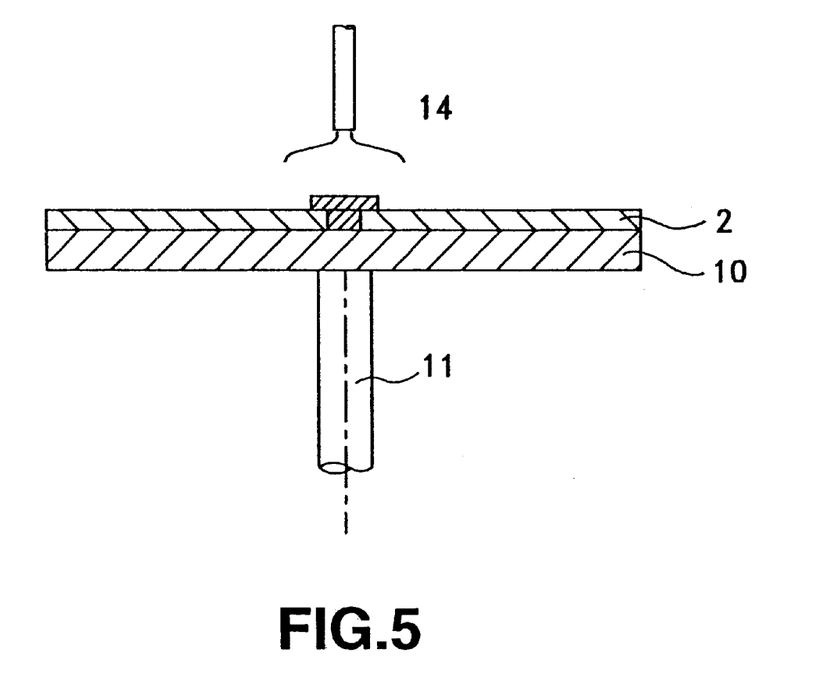
FIG. 5 is a cross-sectional view showing a step of coating of a UV curable resin in the manufacturing method of an optical disc embodying the present invention.

Specifically, a UV curable resin 14 is dripped on the substrate 2 set on the turntable 10, as shown in FIG. 5. At this time, the substrate 2 is kept in a stationary state.

Figure 6:
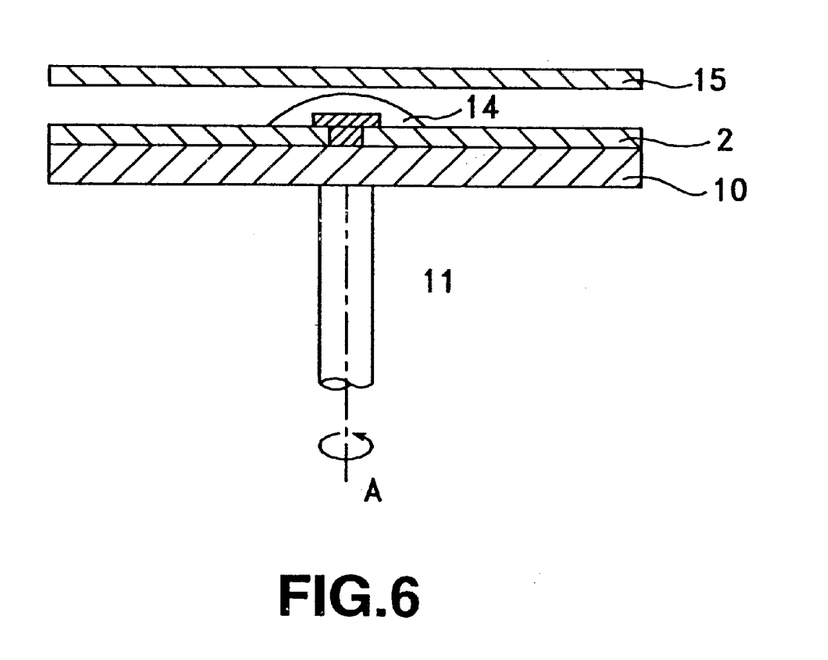
FIG. 6 is a cross-sectional view showing a step of setting a glass plate on the coated UV curable resin in the manufacturing method of an optical disc embodying the present invention.

Then, a glass plate 15 is set on the UV curable resin 14, as shown in FIG. 6. At this time, the substrate 2 is run in rotation along with the glass plate 15 to stretch the UV curable resin 14 on the entire surface of the recording layer 4.

Figure 7:
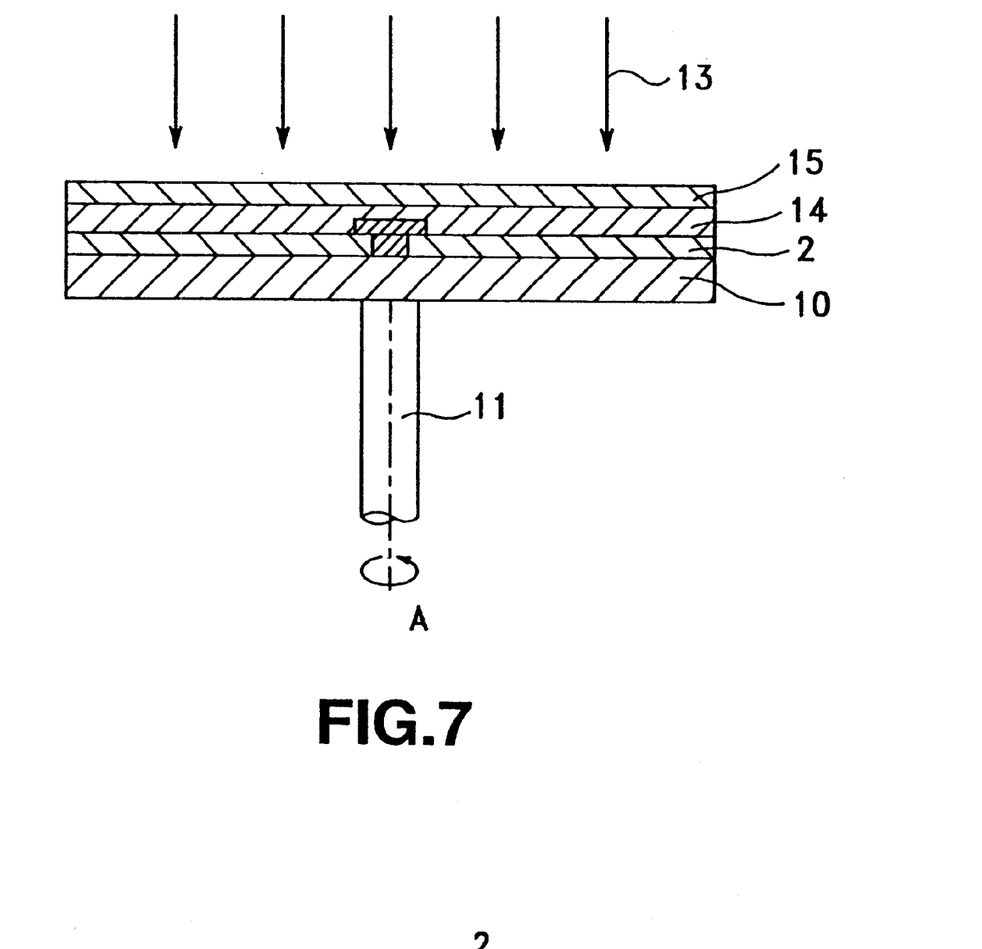
FIG. 7 is a cross-sectional view showing the state in which the UV curable resin is stretched on the entire surface of the recording layer formed on the substrate.

When the UV curable resin 14 is stretched in this manner on the entire surface of the recording layer 4 on the substrate 2, UV rays 13 are illuminated on the substrate 2, kept in rotation along with the glass plate 15, to permit the UV curable resin 14 to be cured to form the light transmitting layer 5. Any excess UV curable resin 14 is whirled off to prevent as much as possible the UV curable resin from being formed as a hump on the outer rim portions of the substrate 2.

Finally, the glass plate 15 is peeled off from the light transmitting layer 5 to produce the optical disc 1.

By setting the glass plate 15 in this manner on the UV curable resin, the light transmitting layer 5 with optimum surface properties can be produced, because the smooth surface properties the glass plate 15 are directly transferred to the produced light transmitting layer 5.

Figure 8:
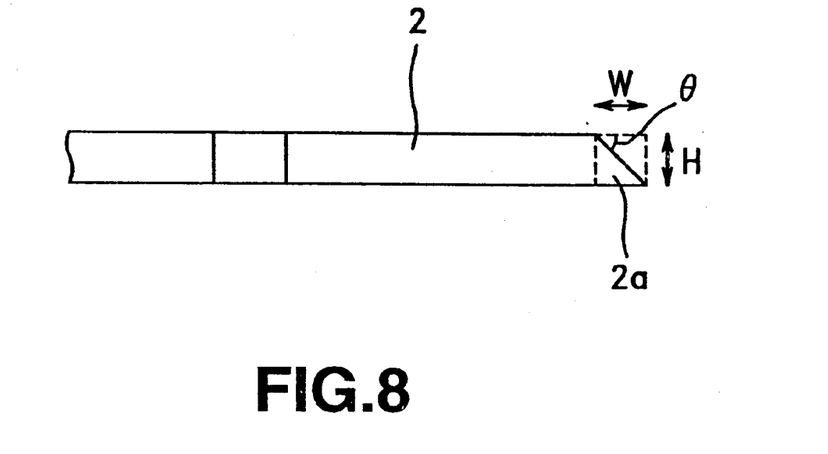
FIG. 8 is a cross-sectional view showing a typical substrate having a cut-out in its outer rim portion and which is used in the manufacturing method of the optical disc embodying the present invention.

For producing the optical disc according to the present invention, it is also possible to mold the outer rim of the substrate 2 with a cut-out 2a and to use this substrate 2 to perform the steps of coating the UV curable resin and the rotating and curing step as shown in FIGS. 3 and 4. If the height H of the substrate 2 is 1.2 mm, the cut-out 2a may have a radial width W of 1.2 mm and an angle of 45°, as shown in FIG. 8.

By using the substrate 2 having the cut-out 2a pre-formed on its outer rim, the light transmitting layer can be produced which can effectively and readily suppress the generation of a humped portion on the outer rim of the substrate. With the present method, the cut-out 2a can be formed during the molding the substrate 2 by a method similar to the method of forming the guide groove or the crests or valleys corresponding to the information signals during molding of the substrate 2. The cutout 2a may also be formed by etching following molding of the usual substrate 2.

Figure 9:
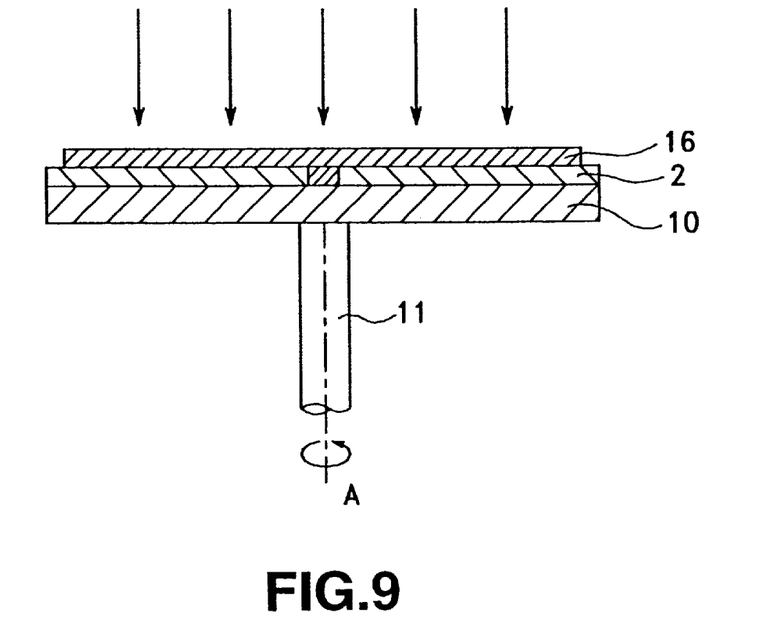
FIG. 9 is a cross-sectional view showing a step of illuminating deep UV only in the outermost rim portion of the substrate carrying the recording layer in the manufacturing method of the optical disc embodying the present invention.

In manufacturing the optical disc according to the present invention, UV rays may be illuminated on the outermost rim of the substrate 2 before dripping the UV curable resin. Specifically, the portion of the substrate 2 excluding its outermost rim portion is covered by a mask 16, before proceeding to drip the UV curable resin, and the so-called UV rays (UV rays of short wavelength ranging between 200 and 300 nm) are illuminated on the outermost rim of the disc. The outermost rim denotes an area lying radially outwardly of the signal recording area and specifically the outermost area of the substrate 2 and/or the recording unit 6.

The mask 16 is peeled off and subsequently the steps of coating the UV curable resin and rotation/curing are carried out to form the ultimate light transmitting layer 5.

With this method, since the UV rays of shorter wavelength are previously illuminated on the outermost portion of the substrate 2, in which the hump is liable to be formed, in order to keep an optimum wetting properties of this outermost rim portion, it is possible to suppress the formation of the hump in the outermost rim of the light transmitting layer 5 to the maximum extent possible to form the light transmitting layer 5 of optimum surface properties.

In the optical disc manufacturing method according to the present invention, the substrate 2 coated with the UV curable resin, obtained on dripping the UV curable resin and stretching it on rotation, may be run in rotation at an elevated rpm for a short time duration prior to illumination of UV rays. That is, the UV curable resin is dripped on the substrate 2 and stretched on rotation, after which the rotation supporting member 11 is run in rotation at an elevated speed for short time duration. After running the substrate 2 in this manner for short time at an elevated rpm, the UV rays are illuminated as shown in FIG. 4 to perform the rotating curing step for the UV curable resin to form the light transmitting layer 5.

By running the substrate 2 in rotation at an elevated rpm before illumination of UV rays, it is possible to whirl off excess UV curable resin collected n the outer rim portion by the centrifugal force on stretching by rotation.

Figure 10:
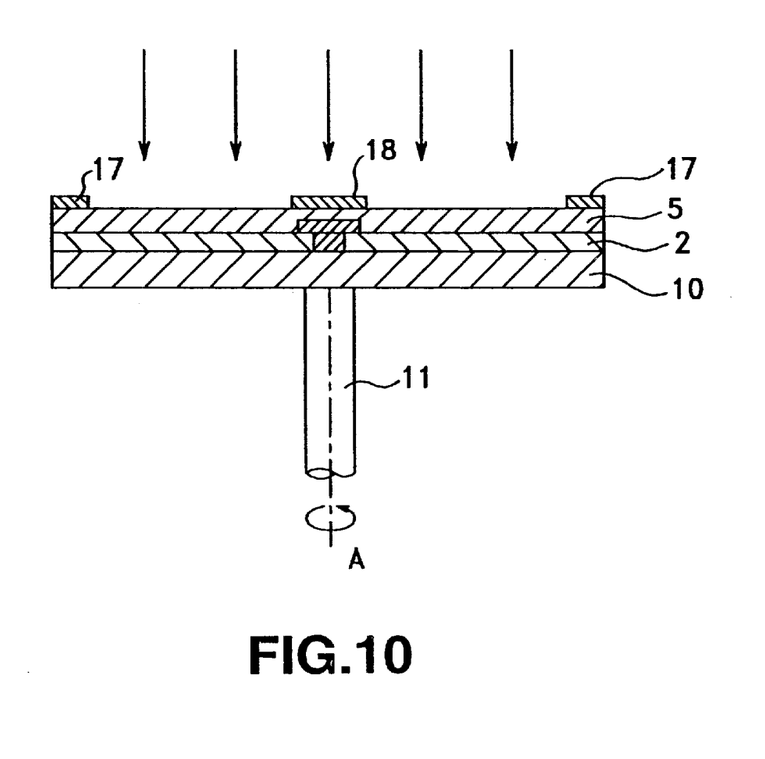
FIG. 10 is a cross-sectional view showing a step of illuminating UV rays only on the UV curable resin positioned on the signal recording area in the manufacturing method of the optical disc embodying the present invention.

As a method for manufacturing the optical disc according to the present invention, it is also possible to illuminate UV rays first on the UV curable resin in the signal recording area, run the substrate at an elevated speed and to illuminate UV rays on the UV curable resin in an area other than the signal recording area.

That is, after the UV curable resin is stretched by rotation on the substrate 2, masks 17, 18 are applied to the UV curable resin lying on the UV curable resin in an area outwardly of the signal recording area 6a and in a center area of the substrate 2 and UV rays are illuminated on the substrate 2 kept in a rotating state. Since the area of the substrate 2 outwardly of the signal recording area 6a is coated by the mask 17, only the UV curable resin which later becomes the signal recording area 6a is illuminated and cured by the UV rays.

Figure 11:
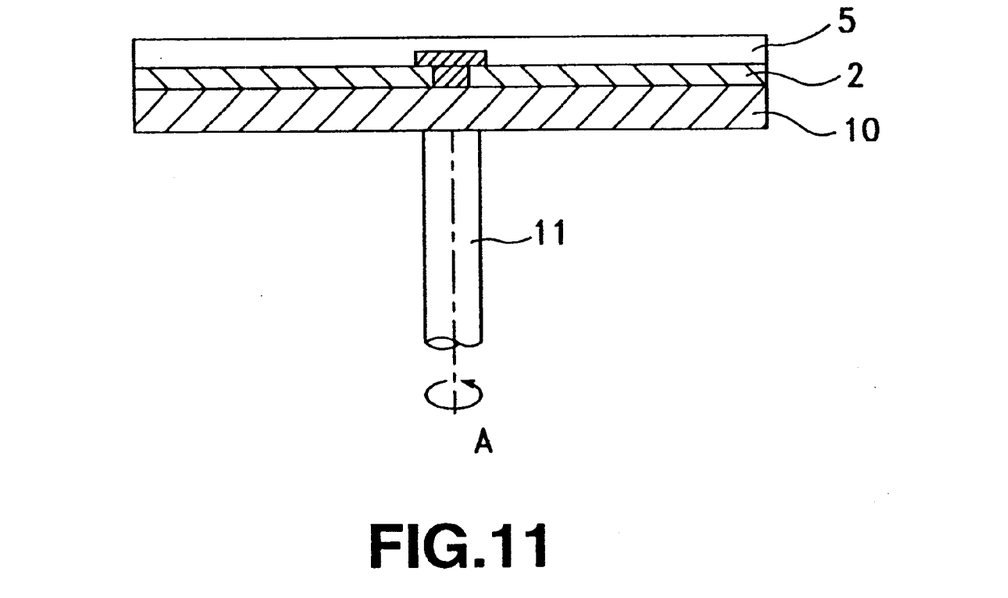
FIG. 11 is a cross-sectional showing a step of exfoliating a mask and rotating the substrate at an elevated speed following the step shown in FIG. 10.

The mask 17 is then peeled off and the substrate 2 then is run in rotation at an elevated rpm. This whirls off excess UV curable resin lying on the outer rim of the substrate.

The rotation of the substrate 2 is further continued as the rpm of the rotation supporting member 11 is decreased to perform the rotation curing of the UV curable resin shown in FIG. 4 to form the light transmitting layer 5.

After illuminating the UV curable resin on the signal recording area 6a, the substrate is run in rotation at an elevated rpm UV curable resin 14 to whirl off excess UV curable resin and UV rays are illuminated on the UV curable resin 14 on the outer rim to produce the light transmitting layer 5 having of optimum surface properties easily and effectively. This method enables the excess UV curable resin on the outer rim to be whirled off more selectively than is possible with the above-described method of running the substrate in rotation at an elevated speed to whirl off excess resin from the outer rim without applying masks following stretching by rotation of the UV curable resin.

Figure 12:
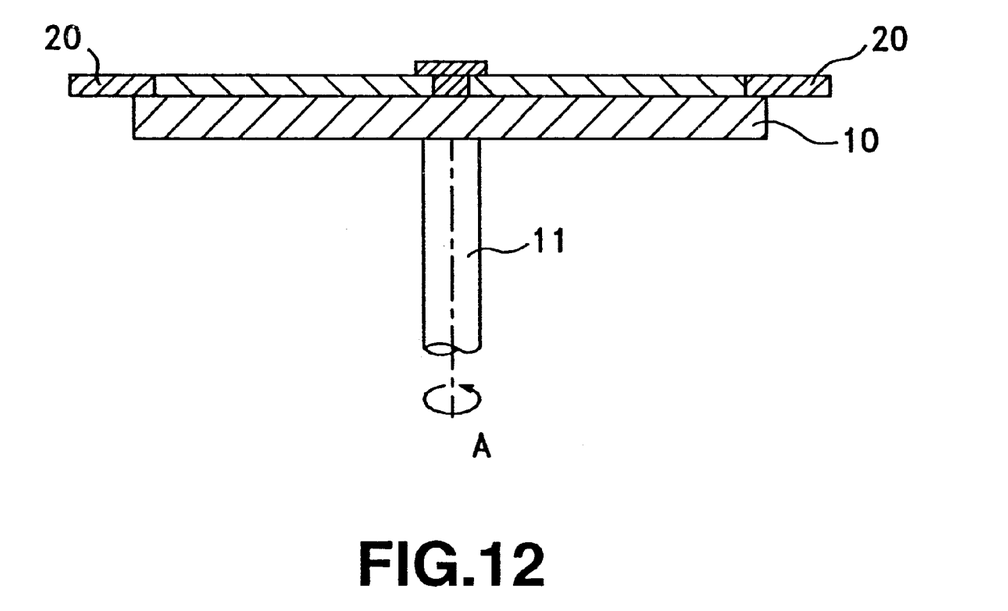
FIG. 12 is a cross-sectional view showing a step of mounting a ring on the outer rim of the substrate in the manufacturing method of the optical disc embodying the present invention.

As the optical disc manufacturing method according to the present invention, it is also possible to use a ring 20 having the same inner diameter as the outer diameter of the manufactured optical disc and the substantially same thickness as the thickness of the optical disc. In this method, the substrate 2 is fitted in the center hole of the ring 20.

Figure 13:
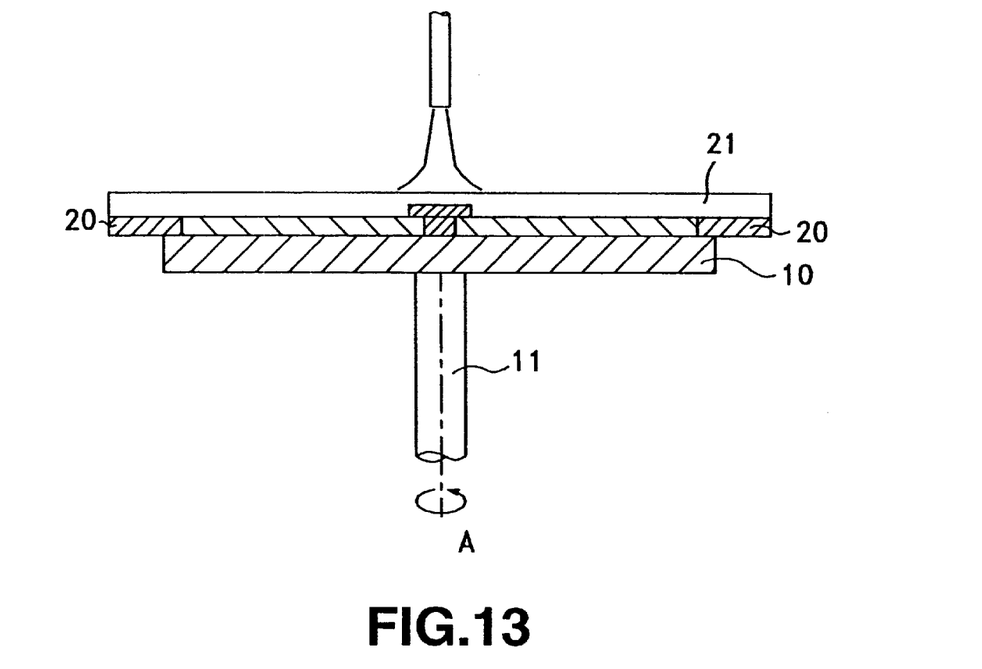
FIG. 13 is a cross-sectional view showing a step of coating a UV curable resin on a substrate carrying the ring and the recording layer following the step of FIG. 12.

As the substrate 2 is run in rotation along with the ring 20 in the direction indicated by arrow A in FIG. 13, a UV curable resin 21 is dripped to stretch the resin on rotation.

Figure 14:
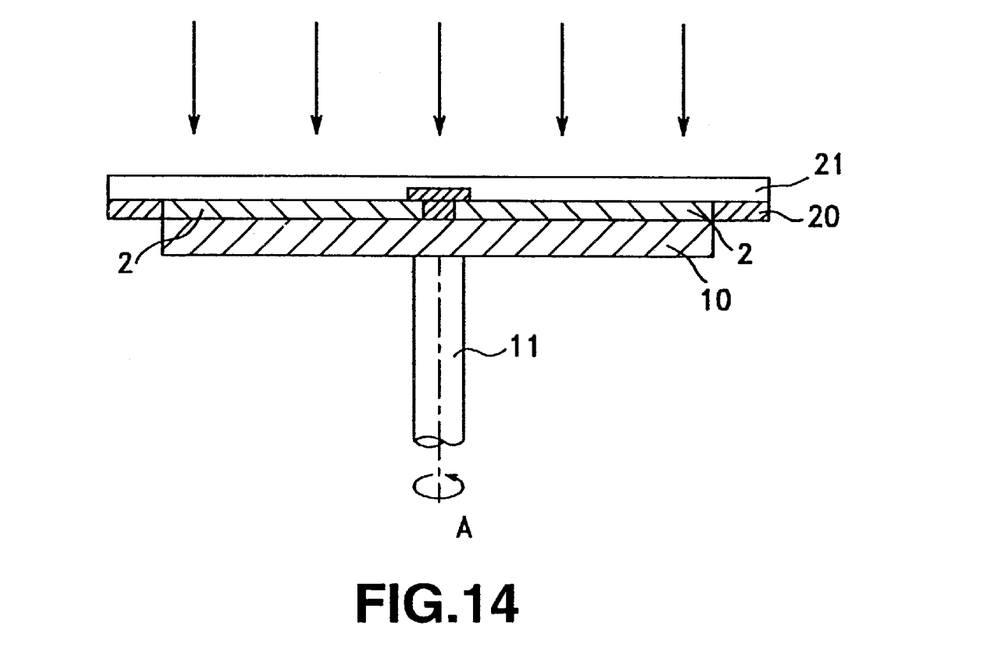
FIG. 14 is a cross-sectional view showing a step of illuminating UV rays on the UV curable resin following the step shown in FIG. 13.

The rotation supporting member 11 is kept rotating at a reduced rpm to run the substrate 2 along with the ring 20 to illuminate UV rays on the UV curable resin 21 to cure the resin.

Figure 15:
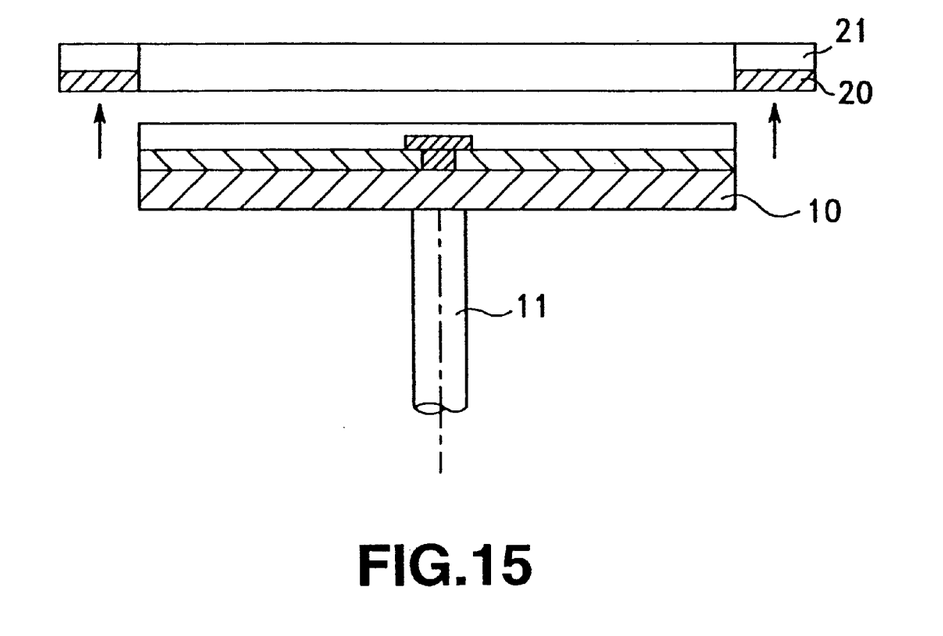
FIG. 15 is a cross-sectional view showing a step of removing the ring and the UV curable resin thereon following the step shown in FIG. 13.

Finally, the ring 20 is dismounted to remove the UV curable resin formed thereon to complete the optical disc 1.

In this manner, the ring 20 is first fitted on the outer rim of the substrate 2, and UV curable resin is coated and cured on the ring 20 and the substrate 2. The ring 20 is then dismounted and the UV curable resin thereon is removed to manufacture the optical disc of optimum surface properties freed of surface irregularities, such as humps, to the maximum extent possible. Since the UV curable resin on the outer rim liable to produce surface humps is not used in the present method as the light transmitting layer, the optical disc produced is of optimum surface properties.

With the optical disc manufacturing method according to the present invention, it is possible to use a substrate having an outer diameter slightly larger than the outer diameter of the usual substrate. Specifically, a substrate 22 having a diameter slightly larger than the outer diameter of the usual substrate is used and, after a recording portion is formed thereon, the substrate 22 is kept in rotation to allow the UV curable resin to be cured as shown in FIGS. 3 and 4 to produce a light transmitting layer 23 having a diameter slightly larger than the outer diameter of the usual substrate shown in FIG. 16. Finally, the light transmitting layer 23 and an excess outer rim 25 of the substrate 22 are cut off to give the same size as the usual substrate size, as indicated by arrow c in FIG. 16, to produce the optical disc 1.

Figure 16:
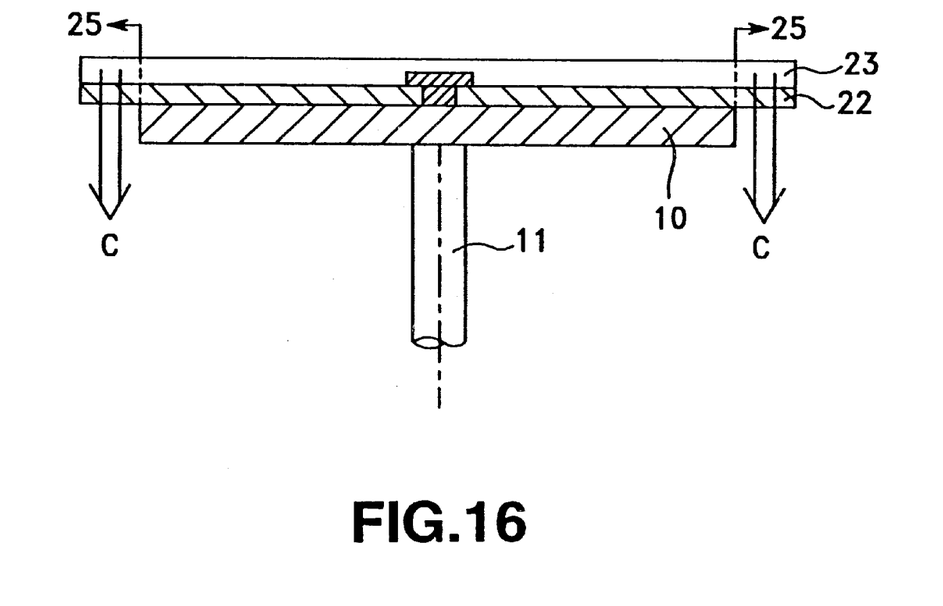
FIG. 16 is a cross-sectional view showing a step of forming a light transmitting layer using a substrate larger in size than a routine substrate as an optical disc manufacturing method embodying the present invention.

With the present method, in which a light transmitting layer of a larger diameter is previously formed and an excess portion of the light transmitting layer on the outer rim is cut off following curing on rotation, the UV curable resin on the outer rim portion liable to form humps is not used as the light transmitting layer, this realizing optimum surface properties.

With the optical disc manufacturing method according to the present invention, it is also possible to get the UV curable resin stretched by rotation on the entire surface on the substrate 2, to wipe off excess UV curable resin on the outermost rim portion by a resin-absorbing material, such as cloth, before curing the resin, and to then perform the rotating curing step of the UV curable resin, as shown in FIG. 4.

With the optical disc manufacturing method according to the present invention, it is also possible to get the UV curable resin stretched by rotation on the entire surface on the substrate 2, to suck excess UV curable resin on the outermost rim portion by a vacuum pump etc, before curing the resin, and to then perform the rotating curing step of the UV curable resin, as shown in FIG. 4.

With the optical disc manufacturing method according to the present invention, it is also possible to get the UV curable resin stretched by rotation on the entire surface on the substrate 2, to blow off excess UV curable resin on the outermost rim portion by nitrogen blowing etc, before curing the resin, and to then illuminate UV rays on the rotating substrate 2, as shown in FIG. 4.

In the optical disc manufacturing method according to the present invention, it is desirable to use the UV curable resin of low surface tension since this permits the UV curable resin on the outer rim area to revert t the inner rim area to suppress formation of humps as far as possible.

Also, in the optical disc manufacturing method according to the present invention, it is desirable to use a UV curable resin of higher viscosity.

What is claimed is:

1. An optical disc in which a recording layer and a light transmitting layer are sequentially formed on a substrate and in which light is incident from the side of the light transmitting layer to record and/or reproduce information signals for a signal recording area of the recording layer, wherein
    a thickness of the light transmitting layer is greater than 100 $\mu$m and wherein
    a radial distance from the outermost area of the substrate to said signal recording area is selected to be at least 0.5 mm larger than a radial width of a hump produced on the outer rim of the light transmitting layer and wherein
    the height of said hump from the surface of the light transmitting layer is 70 $\mu$m or less.

2. The optical disc according to claim 1 wherein the height of said hump from the surface of the light transmitting layer is 20 $\mu$m or less.

3. The optical disc according to claim 1 wherein the radial width of said hump is 1.5 mm or less.

4. The optical disc according to claim 1 wherein the radial width of said hump is 1.0 mm or less.

5. An optical disc in which a recording layer and a light transmitting layer are sequentially formed on a substrate and in which light is incident from the side of the light transmitting layer to record and/or reproduce information signals for a signal recording area of the recording layer, wherein a hump having a radial width of 1.5 mm or less produced on the outer rim of the light transmitting layer and wherein a radial distance from the outermost area of the substrate to said signal recording area is selected to be at least 0.5 mm larger than the radial width of said hump and wherein the height of said hump from the surface of the light transmitting layer is 70 μm or less.

6. The optical disc according to claim 5 wherein the height of said hump form the surface of the light transmitting layer is 20 μm or less.

7. The optical disc according to claim 5 wherein a thickness of the light transmitting layer is greater than 100 μm.

8. An optical disc in which a recording layer and a light transmitting layer are sequentially formed on a substrate and in which light is incident from the side of the light transmitting layer to record and/or reproduce information signals for a signal recording area of the recording layer, wherein a thickness of the light transmitting layer is greater than 100 μm and wherein a hump having a radial width of 1.0 mm or less produced on the outer rim of the light transmitting layer and wherein a radial distance from the outermost area of the substrate to said signal recording area is selected to be approximately 1.0 mm and wherein the height of said hump from the surface of the light transmitting layer is 20 μm or less.

* * * * *